(12) United States Patent
Li et al.

(10) Patent No.: US 12,330,675 B2
(45) Date of Patent: Jun. 17, 2025

(54) METHOD FOR PARKING VEHICLE, ELECTRONIC DEVICE AND MEDIUM

(71) Applicant: Beijing Baidu Netcom Science Technology Co., Ltd., Beijing (CN)

(72) Inventors: Xinjing Li, Beijing (CN); Pengfei Wei, Beijing (CN); Huiling Jian, Beijing (CN); Jia Song, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 378 days.

(21) Appl. No.: 17/871,217

(22) Filed: Jul. 22, 2022

(65) Prior Publication Data

US 2022/0363290 A1 Nov. 17, 2022

(30) Foreign Application Priority Data

Sep. 17, 2021 (CN) .......................... 202111092745.1

(51) Int. Cl.
*B60W 60/00* (2020.01)
*B60W 30/06* (2006.01)
*B62D 15/02* (2006.01)

(52) U.S. Cl.
CPC .......... *B60W 60/001* (2020.02); *B60W 30/06* (2013.01); *B62D 15/0285* (2013.01)

(58) Field of Classification Search
CPC .... B60W 60/001; B60W 30/06; B60W 40/00; B60W 40/02; B62D 15/0285; G01C 21/20; G01C 21/3807; G01P 1/00; G08G 1/143; G08G 1/168
See application file for complete search history.

(56) References Cited

U.S. PATENT DOCUMENTS

| 2014/0309885 | A1  | 10/2014 | Ricci |
| 2016/0068158 | A1  | 3/2016  | Elwart et al. |
| 2016/0159366 | A1  | 6/2016  | Tsuyunashi et al. |
| 2017/0076603 | A1* | 3/2017  | Bostick ............. B62D 15/0285 |
| 2018/0215392 | A1* | 8/2018  | Kosaka ............... B60W 50/12 |

(Continued)

FOREIGN PATENT DOCUMENTS

| CN | 109466545 A |   | 3/2019 |              |
| CN | 110070752 A | * | 7/2019 | ............ G08G 1/143 |

(Continued)

OTHER PUBLICATIONS

English translation of CN110070752 (Year: 2024).*

(Continued)

*Primary Examiner* — Jelani A Smith
*Assistant Examiner* — Paul A Castro
(74) *Attorney, Agent, or Firm* — Knobbe, Martens, Olson & Bear, LLP

(57) ABSTRACT

The present disclosure provides a method for parking a vehicle, an electronic device and a medium. The method comprises: acquiring parking environment data of a parking environment related to a vehicle and historical parking data in the parking environment; selecting, according to the parking environment data and the historical parking data, a constraint set for parking the vehicle from a plurality of constraint sets, the plurality of constraint sets corresponding to a corresponding parking risk level; and controlling the vehicle to park according to the selected constraint set.

18 Claims, 5 Drawing Sheets

(56) References Cited

U.S. PATENT DOCUMENTS

2019/0299981 A1  10/2019  Yoon et al.
2021/0094571 A1   4/2021  Yu et al.
2023/0339467 A1* 10/2023  Noh .................. B62D 15/0285

FOREIGN PATENT DOCUMENTS

CN    111824130 A   10/2020
CN    113015667 A    6/2021
WO   2021226773 A1  11/2021

OTHER PUBLICATIONS

First Office Action in corresponding Chinese Application No. 202111091745.1 dated Mar. 14, 2022 in 16 pages.
Second Office Action in corresponding Chinese Application No. 202111091745.1 dated Jun. 2, 2022 in 14 pages.

* cited by examiner

METHOD FOR PARKING VEHICLE, ELECTRONIC DEVICE AND MEDIUM

CROSS-REFERENCE TO RELATED APPLICATIONS

The present application claims the priority of Chinese Patent Application No. 202111092745.1, titled "METHOD AND APPARATUS FOR PARKING VEHICLE, ELECTRONIC DEVICE AND MEDIUM", filed on Sep. 17, 2021, the content of which is incorporated herein by reference in its entirety.

TECHNICAL FIELD

The present disclosure relates to the field of computer technology, and specifically to the field of autonomous driving technology. More specifically, the present disclosure relates to a method and an apparatus for parking a vehicle, an electronic device, a computer readable storage medium and a program product.

BACKGROUND

In order to solve the parking requirement of the last kilometer in an open scenario, a memory parking function has been proposed. A user only needs to complete the learning for a route map according to a system prompt, and thus, a vehicle can automatically travel to a target parking space or can be called to automatically leave a garage, according to a learned route in the subsequent use. Memory Parking only uses a sensor around the body of the vehicle to construct a scenario map through a simultaneous localization and mapping (SLAM) technology, and can achieve high-precision positioning without relying on a high-precision map.

However, due to the cost, most of the current memory parking systems use a sensor scheme in which a low-cost vision sensor dominates and an ultrasonic radar assists. Due to the limitations of the arrangement of the visual sensor and an environmental factor such as light, it is difficult for the memory parking systems to cope with all working conditions during parking, which limits the application of the memory parking systems.

SUMMARY

According to example embodiments of the present disclosure, a technical solution in which a vehicle is adaptively parked is provided.

According to a first aspect of the present disclosure, some embodiments of the present disclosure provide a method for parking a vehicle, including: acquiring parking environment data of a parking environment related to a vehicle and historical parking data in the parking environment; selecting, according to the parking environment data and the historical parking data, a constraint set for parking the vehicle from a plurality of constraint sets, the plurality of constraint sets corresponding to a corresponding parking risk level; and controlling the vehicle to park according to the selected constraint set.

According to a second aspect of the present disclosure, some embodiments of the present disclosure provide an electronic device, including: at least one processor; and a storage device, communicated with the at least one processor, wherein the storage device stores an instruction executable by the at least one processor, and the instruction is executed by the at least one processor, to enable the at least one processor to perform the method according to any one of the embodiments in the first aspect of the present disclosure.

According to a third aspect of the present disclosure, some embodiments of the present disclosure provide a non-transitory computer readable storage medium, storing computer instruction, wherein the computer instruction is used to cause a computer to perform the method according to any one of the embodiments in the first aspect of the present disclosure.

Through the technical solution of the present disclosure, the usage mode of the parking can be adaptively controlled for a different risk level of the parking environment, thereby widening the application scenarios of the parking technology.

It should be understood that the content described in this part is not intended to define key or important features of the embodiments of the present disclosure, and is not used to limit the scope of the present disclosure. Other features of the present disclosure will be easily understood through the following description.

BRIEF DESCRIPTION OF THE DRAWINGS

The above and other features, advantages and aspects of various embodiments of the present disclosure will become more apparent in combination with the accompanying drawings and with reference to the following detailed description. In the accompanying drawings, the same or similar reference number refers to the same or similar element. Here.

DETAILED DESCRIPTION OF EMBODIMENTS

Figure 1:
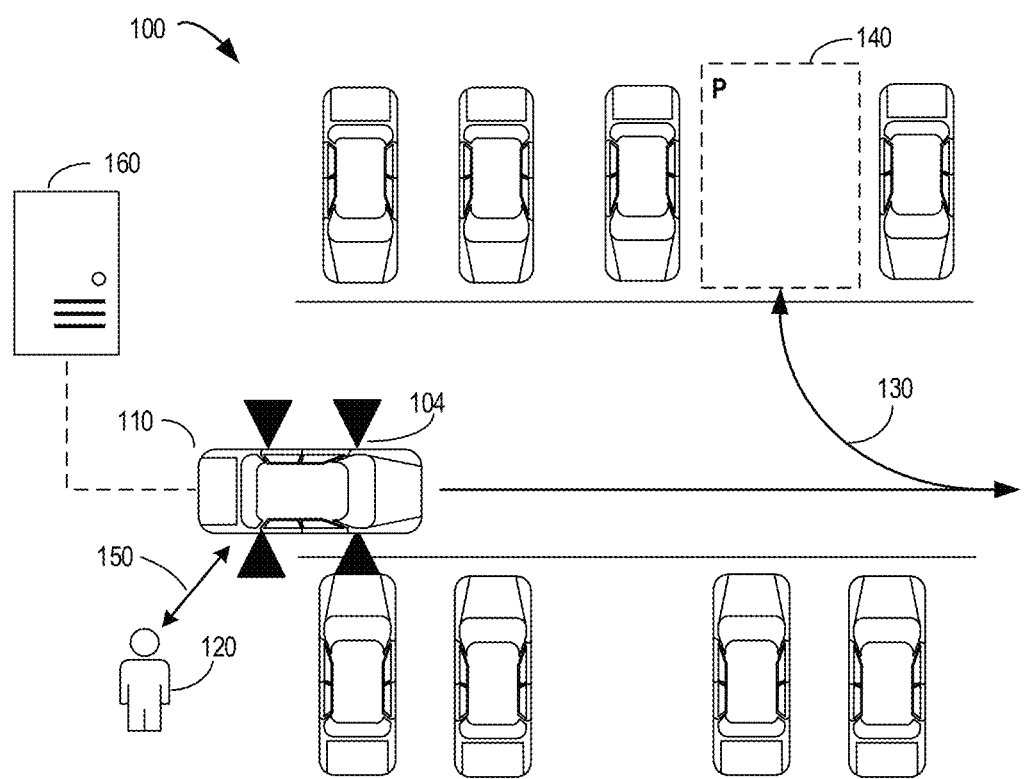
FIG. 1 is a schematic diagram of an example environment in which an embodiment of the present disclosure may be implemented.

The embodiments of the present disclosure will be described below in more detail with reference to the accompanying drawings. Although certain embodiments of the present disclosure are shown in the accompanying drawings, it should be understood that the present disclosure may be embodied in various forms, and should not be construed as being limited to the embodiments set forth herein. Rather, these embodiments are provided in order to make a more thorough and complete understanding for the present disclosure. It should be understood that the accompanying drawings and embodiments in the present disclosure are for illustrative purposes only, and are not used to limit the scope of protection of the present disclosure.

In the description for the embodiments of the present disclosure, the term "comprising" and its analogous terms should be understood as openly-inclusive (i.e., "including, but not limited to"). The term "based on" should be understood as "at least partially based on". The term "an embodiment" or "the embodiment" should be understood as "at least one embodiment". The terms such as "first" and "second" may refer to different or identical objects. Other explicit and implicit definitions may further be included in the following description.

The current autonomous driving field mainly includes the following parking modes: an automatic parking assist (APA) mode, a remote parking mode (Remote Parking Assist (RPA) mode), a memory parking mode (Home Autonomous Valet Parking (HAVP) mode), and a valet parking mode (Public Autonomous Valet Parking (PAVP) mode). Each parking mode supports pulling the vehicle out a parking position and parking the vehicle into the parking position.

The automatic parking assist APA automatically searches for a parking space when the vehicle is cruising at a low speed. After the parking space is searched, a corresponding parking space is selected. When the brake is released, the vehicle may automatically enter into the parking space. During the automatic parking, the user needs to sit in the vehicle. The automatic parking is used in the vicinity of the target parking space. At the same time, it is required to pay attention to the brake, the gear position, the steering wheel, and the like in the whole course. Accordingly, the automatic parking has a high safety guarantee, but has a big use limitation.

The remote parking mode RPA mode refers to that a remote control portion is added on the basis of the APA. Generally, in the remote parking, a mobile device application (APP) or a remote control key is used as a remote control apparatus. The remote control key communicates with the entire vehicle by radio frequency, and the mobile device APP communicates with the vehicle by Bluetooth. The remote parking mainly includes remote straight-in, remote parking-in and remote pulling-out. The remotely controllable range of the remote parking requires the user to be within a short range (e.g., 5 meters) of the target parking space or vehicle.

For the memory parking (HAVP), also known as self-learning parking, the vehicle needs to learn a specific parking route. At the starting point of the parking route, the user turns on the "parking route learning" function, and then parks the vehicle into a fixed parking position. Accordingly, the vehicle learns the driving and parking routes autonomously and record the routes in the "memory" of the vehicle. Upon completion of the learning of the parking route, the vehicle can implement the automatic parking-in and pulling-out by imitating the previously learned parking route. This approach liberates the user to a great extent, brings convenience to the user, but requires a high safety level, and has high requirements on the vehicle performance and the environmental condition.

For the autonomous parking (PAVP), after the passenger disembarks at a specific position at a parking lot entrance, the vehicle determines a parking route according to the information obtained by a vehicle terminal or according to the information from a parking lot side, and autonomously parks into an available parking position in the parking lot. The autonomous parking depends on a high-precision map, and the use scenario of the autonomous parking is limited to a public garage of a large-scale shopping mall, etc. A high-precision device such as a laser radar is generally used for the collecting for the map, and at the same time, a large amount of manual labeling is required, resulting a high cost and a limited application range.

As described above, each parking mode has its limitation, which often makes the application of the parking technology limited, and thus, the user cannot select the appropriate parking technology according to the conditions of the vehicle and the parking environment.

The present disclosure provides a method and an apparatus for parking a vehicle, an electronic device and a medium. According to the method, parking environment data of a parking environment of a vehicle and historical parking data of the vehicle in the parking environment are acquired, thus determining the risk of the parking environment. The method further includes: selecting a corresponding constraint set from a plurality of constraint sets. The plurality of constraint sets reflect a corresponding parking risk. Then, the vehicle is controlled to park according to the selected constraint set. Here, the constraint set defines a usage mode of the parking technology. If it is determined that the risk of the current parking environment is high, a more secure constraint set may be selected, and if it is determined that the risk is low, a more convenient constraint set may be selected. Accordingly, the usage mode of the parking technology can be flexibly adjusted, and the application range of the parking technology can be widened, which brings convenience to the user while the safety is guaranteed.

The embodiments of the present disclosure will be described in detail below with reference to the accompanying drawings.

FIG. 1 is a schematic diagram of an example environment 100 in which an embodiment of the present disclosure may be implemented. The example environment 100 is suitable, for example, for a parking application scenario. For example, a user 120 drives a vehicle 110 into a parking environment, and it is desired that the vehicle can be parked into a target parking space without the manual driving of the user. Herein, the parking environment may be a geographic area (e.g., a parking lot) or may be one or more road sections within the geographic area. For example, the vehicle may pass through a plurality of different road sections (each of which may be referred to as a parking environment), while traveling to a parking space in the parking lot. In addition, herein, the parking includes a process of parking into the parking space and a process of pulling out the parking space, and specifically includes a process in which the vehicle travels to the vicinity of the parking space and a process in which the vehicle travels into the parking space from the vicinity of the parking space, as well as a process in which the vehicle travels to the vicinity of the user from the parking space.

As shown in FIG. 1, the vehicle 110 may already learn or remember a route 130, and the user 120 expects the vehicle 110 to park at the target parking space 140 after passing through the route 130. In some embodiments, the vehicle 110 may autonomously travel to the parking space 140 without requiring the user 120 to perform a supervision in the vehicle and control and take over, if necessary, the vehicle 110. In some embodiments, the user 120 is required to stay in the vehicle for supervision and to control and take over the vehicle 110 if necessary. Although FIG. 1 shows that the parking is performed in the situation where the user 120 is outside the vehicle 110, it should be understood that the user 120 may also stay in the vehicle 110.

To achieve the parking that does not require the manual driving of the user, the vehicle 110 may include various types of sensors, for example, a vision sensor (including a wide angle camera and a surround view camera), an ultrasonic radar (including UPAS in the front and rear of the vehicle and an APA in the side of the vehicle) and an inertial sensor. With these sensors, the vehicle 110 can sense and identify a stationary or moving object in the parking environment and construct a map of the parking environment. For clarity, FIG. 1 only schematically shows the radar 104 in the side of the vehicle 110.

The vehicle 110 may be connected to a server 160 through, for example, a cellular network (e.g., a 4G network and a 5G network), and transmit travelling data (e.g., image data, position data and travelling data (e.g., braking, a vehicle speed and a direction) that are sensed by the sensors) to the server 160.

In some embodiments, the user 120 may interact 150 with the vehicle 110 through a vehicle-machine interaction (the user is in the vehicle), or through a remote key or a mobile device (the user is outside the vehicle) via a cellular (e.g., 4G and 5G) and/or Bluetooth communication, For example, the user 120 may control the vehicle 110 to move forward and backward, and control the braking, vehicle speed, gear position, direction, etc., of the vehicle 110. The interaction information of the user 120 and the vehicle 110 may also be transmitted and stored to the server 160.

Embodiments of the present disclosure are described above with reference to a scenario where the vehicle 110 is parked into the parking space 140. However, it should be appreciated by those skilled in the art that the embodiments of the present disclosure are also applicable to an application scenario where the vehicle is pulled out the parking space.

Figure 2:
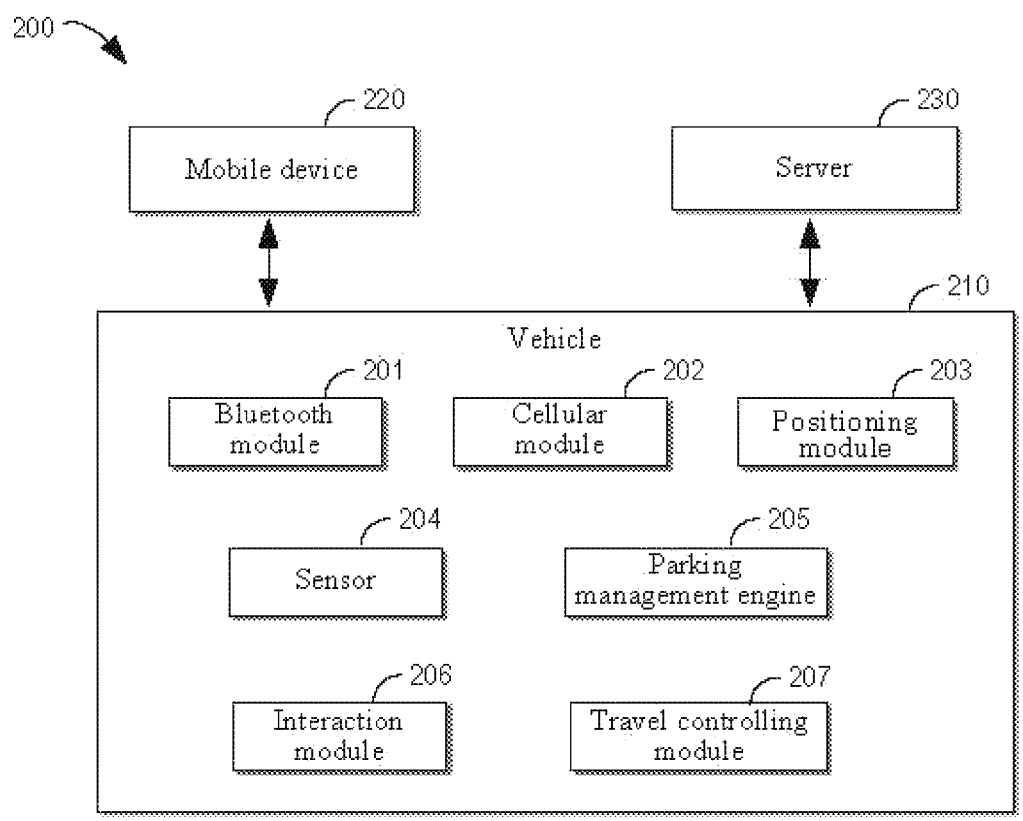
FIG. 2 is a schematic block diagram of a parking system according to an embodiment of the present disclosure.

FIG. 2 is a schematic block diagram of a parking system 200 according to an embodiment of the present disclosure. The parking system 200 includes a vehicle 210, a user-controlled mobile device 220, and a server 230 located in the cloud.

The vehicle 210 may include a Bluetooth module 201. The vehicle 210 may communicate with the mobile device 220 via the Bluetooth module 201. For example, a vehicle control signal is received from the mobile device 220, so as to remotely control the vehicle 210 to park. In some embodiments, in order to ensure a good quality of the Bluetooth communication between the mobile device 220 and the vehicle 210, the mobile device 220 and the vehicle 210 are maintained within a distance (e.g., 0 to 30 meters). In some embodiments, the quality (e.g., stability and speed) of communication between the Bluetooth module 201 and the mobile device 220 may be detected, to be used to determine whether it is permitted to use the Bluetooth module 201 to receive an instruction from the user during parking.

The vehicle 210 further includes a cellular module 202. The vehicle 210 may communicate with the server 230 via the cellular module 202. For example, the vehicle 210 may transmit sensor data, travelling data, position data, etc., to the server, and receive static environment information (e.g., map data) and dynamic environment information (e.g., weather data) of a parking environment from the server 230. In some embodiments, the vehicle 210 may further communicate with the mobile device 220 via the cellular module 202. In the case of good cellular communication quality, the mobile device 220 and the vehicle 210 can communicate with each other even if the mobile device 220 and the vehicle 210 are separated by a relatively long distance. In some embodiments, the quality (e.g., stability and speed) of communication between the cellular module 202 and the server 230 may be detected, to be used to determine whether it is permitted to use the cellular module 202 to receive an instruction from the user during parking.

The vehicle 210 includes a positioning module 203, for example, a GPS module. The positioning module 203 is used to determine a geographical position of the vehicle 210, for example, to determine whether the vehicle 210 is in a predetermined parking environment (e.g., a parking lot) based on longitude and latitude information. When it is determined that the vehicle 210 is in the predetermined parking environment, the vehicle 210 may acquire associated parking environment data and historical parking data generated within the parking environment from the server 230 via the cellular module 202. Here, the historical parking data refers to a behavior that the user 120 or an other user controls a vehicle in the parking environment, for example, braking or taking over the vehicle.

The vehicle 210 further includes a sensor 204 disposed on the body of the vehicle. As described above, the sensor 204 may include, but not limited to, a vision sensor, an ultrasonic radar, an inertial sensor, and the like. The vision sensor includes a surround view camera disposed around the periphery of the vehicle to provide a 360-degree image and a wide angle camera disposed in the front of the vehicle. The ultrasonic radar includes a plurality of ultrasonic radars (referred to as "UPAS") disposed in the front and rear of the vehicle to be used to measure obstacles before and behind the vehicle, and an ultrasonic radar (referred to as "APA") disposed in the side of the vehicle to be used to measure obstacles on the side of the vehicle. Through the sensor 204, a map of the parking environment of the vehicle can be constructed. Through these sensors 204, dynamic environment information in the parking environment of the vehicle may further be detected, for example, a lighting condition and an occurrence frequency of obstacles.

A parking management engine 205 is used to determine a corresponding parking mode according to the parking environment. To this end, the parking management engine 205 may acquire the static environment information of the parking environment that is pre-stored or received via the cellular module 202, for example, a road width, a complexity and a parking space size. The parking management engine 205 may further acquire the dynamic environment information of the parking environment. For example, the parking management engine 205 may acquire the dynamic environment information of the parking environment via the sensor 204, such as weather and a current traffic flow. The parking management engine 205 may further acquire the communication quality related to the Bluetooth module 201 and the cellular module 202, for example, the speed and stability of a network. Using these information, the parking management engine 205 may determine the risk level of the current parking environment.

In some embodiments, the parking management engine 205 may further acquire historical parking data of the parking environment via the cellular module 202. The historical parking data includes statistical data of a historical behavior (e.g., a user takeover behavior and a braking behavior) in the parking environment. The historical parking data reflects a risk of the parking environment. If there are many braking or takeover behaviors in the parking environment, indicating a high risk or a risk higher than expected, a higher risk level can be determined accordingly.

The parking management engine 205 may manage the parking environment, mark the parking environment with a corresponding risk level, and configure at least one corresponding parking constraint for each risk level. The constraint includes requiring the user to be in the vehicle or permitting the user to be outside the vehicle, limiting an interaction medium of the user and the vehicle 210, a vehicle speed, a distance between the user and the vehicle and a supervision responsibility, and the like. Parking constraints may be grouped into a constraint set, and the parking management engine 205 maps the determined risk level to a corresponding constraint set.

An interaction module 206 provides an interaction between the user and the vehicle 210. The interaction may include a vehicle-machine interaction in the vehicle, an interaction between the mobile device 220 and the vehicle 210, an interaction between the user and the body of the vehicle, and the like. For example, the user may input an instruction to the vehicle 210 via a touch screen or an other input/output apparatus to provide control for the vehicle, and the vehicle 210 provides a state alert, a takeover alert, an exception alert and other prompt information for the user.

A travel control module 207 is used to control the vehicle 210 to travel toward the target parking space and park at the target parking space. During this time, the vehicle 210 needs to satisfy the constraint set determined by the parking management engine 205, otherwise a reminder may be issued to the user through the interaction module 206, requiring the user to operate to satisfy the constraint on parking. The constraint set will be described in detail below with reference to FIG. 3.

The mobile device 220 may communicate with the vehicle 110 and the server 230 via a Bluetooth or cellular communication. For example, via an application (APP) of the mobile device 220, an instruction to control the vehicle 110 is sent, and the state alert, the takeover alert and the exception alert related to the vehicle 210 are received.

The server 230 may store the parking environment data and the historical parking data, and may send the parking environment data and the historical parking data to vehicle 210. The server 230 may update the parking environment data and the historical parking data according to the sensing data from the vehicle 210 and a user behavior. In some embodiments, the parking management engine 205 may alternatively be deployed at the server 230. In this case, the server 230 may determine the risk level and corresponding constraint set of the parking environment in response to a parking request from the vehicle 210, for controlling the vehicle 210 to park into or pull out the parking space.

Figure 3:
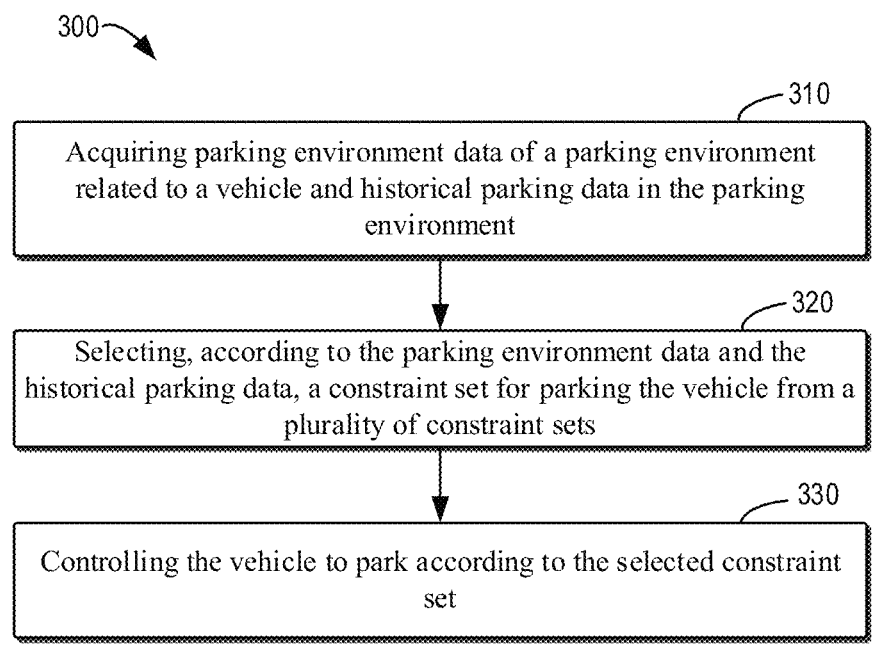
FIG. 3 is a schematic flow diagram of a method for parking a vehicle according to an embodiment of the present disclosure.

FIG. 3 is a schematic flow diagram of a method 300 for parking a vehicle according to an embodiment of the present disclosure. The method 300 may be performed at, for example, the vehicles 110 and 210.

At block 310, the vehicle acquires parking environment data of a parking environment related to a vehicle and historical parking data in the parking environment. When it is determined through the positioning module 203 that the vehicle enters a preset geographical area and is ready to park, the vehicle acquires the information related to the parking environment to determine how to park.

In some embodiments, the parking environment data includes static environment information of the parking environment. The static environment information represents environmental information that does not change or changes slowly over time, including, but not limited to, information related to a road condition and a parking space condition. For example, the static environment information may include a road width, a curvature, a slope, a number of lanes, a shape of an intersection on a route (e.g., a cross-shaped intersection, a Y-shaped intersection, a special-shaped intersection, a ring-shaped intersection and a U-turn intersection) of a plurality of road sections through which the vehicle travels to a target parking space along a pre-remembered route. The static environment information may further include a visual condition of the parking space, a size of the parking space, and a size of the surrounding space of the parking space. The static environment information may be acquired from the server 230 in advance and stored locally in the vehicle, or may be sensed by the vehicle through the sensor 204.

In some embodiments, the parking environment data further includes dynamic environment information of the parking environment. The dynamic environment information represents environmental information that changes rapidly over time, including, but not limited to, traffic information, weather information, positioning reference information, and the like. For example, the traffic information may include a traffic participant on the road, e.g., a large/special-shaped vehicle, a non-motor vehicle, a pedestrian and a motor vehicle. The traffic information may further include a degree of mixing of the non-motor vehicle and the pedestrian, a congestion situation of the motor vehicle, a road occupancy situation by construction, etc. in a current parking environment. The weather situation may include light and weather information. The positioning reference information may include a change situation of a fixed reference along the parking route and a change situation of a semantic element. The dynamic environment information may be acquired from the server 230 in advance and stored locally in the vehicle, or may be sensed by the vehicle through the sensor 204.

In some embodiments, the dynamic environment information may further include communication condition information. The communication condition information may include, but not limited to, the communication quality of the Bluetooth module 201 and the cellular module 202, for example, the stability and transmission speed of each of the Bluetooth module 201 and the cellular module 202. The communication condition information may be obtained from the actual measurement of the vehicle.

As described above, the vehicle further acquires the historical parking data in the parking environment. The historical parking data records statistical data (e.g., a number of times, a frequency or a proportion) of historical behaviors generated by users in the current parking environment for a period of time (e.g., a day, a week, a month). The historical behaviors include a takeover behavior and braking behavior generated by a current user and an other users. It should be appreciated that the more frequent the user behavior is, the higher the risk of the parking environment is than expected. The user behavior may be made by the user in response to the prompt information of the vehicle, or may be made by the user after the user himself observes the environment and senses a risk. The user behavior may be recorded locally and may be uploaded to the server 230. Therefore, the historical parking data may be acquired by accessing the server 230.

At block 320, the vehicle selects, according to the parking environment data and the historical parking data, a constraint set for parking the vehicle from a plurality of constraint sets. Here, the plurality of constraint sets correspond to a corresponding parking risk level. The parking environment data and the historical parking data give a risk prompt of the current parking environment. Thus, rating management may be performed on different parking environments through the parking management engine 205. As an example, three risk levels are given.

A low risk level satisfies the following conditions: a good weather environment, stable light, a spacious road, a simple road structure, a single type and low occurrence frequency of an obstacle, most of users having no takeover or braking on a current road, and a good network condition.

A medium risk level satisfies the following conditions: a normal weather environment, stable light, a moderately spacious road, there being a certain curve and a certain intersection, various types of obstacles, a medium occurrence frequency of the obstacles, most of users having a certain takeover on a current road, and a normal network condition.

A high risk level satisfies the following conditions: a bad weather environment, unstable light, a narrow road, there being many curves and many intersections, various types of obstacles, a high occurrence frequency of the obstacles, most of users having frequent takeovers on a current road, and a bad network condition.

Only three exemplary risk levels are shown above. It should be understood that the risk level is not limited to the three levels and may include more or fewer risk levels. In some embodiments, the risk level may be determined through any model (e.g., a neural network model) known or developed in future. Specifically, the model may be trained, and used to infer the risk level of the parking environment from the acquired parking environment data and historical parking data. Alternatively, each piece of data in the parking environment data and the historical parking data may be categorized according to experience, so as to determine the risk level of the parking environment with reference to a preset rule.

In some embodiments, different usage constraints applicable to the current parking environment may be determined based on the risk level. Herein, a constraint refers to a permission or restriction condition related to the autonomous parking of the vehicle.

In some embodiments, the constraint may include a position of the user relative to the vehicle. For example, the user is required to remain in the vehicle during the parking, or the user is allowed to be outside the vehicle. The constraint may further include a type of an interaction between the user and the vehicle. For example, an interaction is performed through a vehicle-machine interaction (e.g., a touch screen or an other controller) in the vehicle, the user uses a mobile device to interact with the vehicle via a Bluetooth communication, the user uses a mobile device to interact with the vehicle via a cellular communication, and the user uses a remote key to interact with the vehicle. In addition, the constraint may further include an interactive manner, for example, a single click or a long press. In some cases, the user is required to hold a long press to park, or to make a single click to park, without requiring the user to keep the interactive state at all times.

The constraint may include a distance between the user and the vehicle. For example, the distance is 0 (i.e., the user is in the vehicle), 0-30 meters, 0-100 meters, or unlimited. It should be appreciated that the type of the interaction and the distance should be compatible with each other, that is, the distance conforms to the limitation of the type of the interaction. For example, when the constraint refers to the Bluetooth communication, the distance should generally not exceed 30 meters. The cellular communication may not limit the distance.

The constraint may further include a limitation to a vehicle speed. The vehicle speed may be expressed as a range of the vehicle speed, that is, a range of the permitted moving speed of the vehicle during parking.

The constraint may further include a requirement for the user to supervise the vehicle, including requiring the user to supervise the vehicle, or permitting the user not to supervise the vehicle. The supervision means that a state in which the user may interact with the vehicle and may randomly control the vehicle is required to be maintained. For example, when the user is in the vehicle, the user is required to hold the steering wheel by hand, and when the user is outside the vehicle, the mobile device APP is required to be in an active state.

Constraints are grouped into a constraint set, and the constraint set includes one or more constraints. In some embodiments, the parking management engine 205 may maintain the corresponding relationship between the plurality of constraint sets and the risk level, and may select, according to the determined risk level, one constraint set from the plurality of constraint sets for use in the current parking environment. As an example, four constraint sets are given, as shown in Table 1.

TABLE 1

| Usage mode | In vehicle | Outside vehicle | In vehicle | Outside vehicle |
| --- | --- | --- | --- | --- |
| Usage medium | Vehicle-machine | Bluetooth | Cellular network Long press | Cellular network Single click |
| Distance | In vehicle | 0-30 m | 0-100 m | Unlimited |
| Vehicle speed | 7-15 kph | 7 kph | 7 kph | 7-15 kph |
| Supervisory Responsibility | Need to be supervised | Need to be supervised | Need to be supervised | Not need to be supervised |

Only four exemplary constraint sets are shown above. It should be understood that the constraint sets are not limited to the four sets, and may include more or fewer constraint sets. Furthermore, the number of risk levels and the number of constraint sets may be the same or different.

In some embodiments, the constraint set may be inferred directly from the parking environment data and the historical parking data. The constraint set may be determined by any model (e.g., a neural network model) known or developed in future. Specifically, the model may be trained, and used to infer the constraint set applicable to the parking environment from the acquired parking environment data and historical parking data. Alternatively, each piece of data in the parking environment data and the historical parking data may be categorized according to experience, so as to select the constraint set with reference to a preset rule.

Further referring to FIG. 3, at block 330, the vehicle is controlled to park according to the selected constraint set. The vehicle travels along the parking route to the parking space until the parking is completed. In this process, the parking route may be divided into a plurality of parking environments. Thus, in a first parking environment (e.g., a first road section), the vehicle may be parked according to a first constraint set, in a second parking environment (e.g., a second road section), the vehicle may be parked according to a second constraint set, and so on. In addition, in an N-th parking environment, for example, the last stage in which the vehicle enters the parking space from the vicinity of the parking space, the vehicle may be parked according to an N-th constraint set. It should appreciated that, for each parking environment described above, the corresponding risk level and/or constraint set may be determined, and for the each parking environment, the corresponding parking environment data and historical parking data may further be maintained.

In some embodiments, a takeover behavior and braking behavior of the user of the vehicle in a process of controlling the vehicle to park may be acquired. The generation time and positions of these behaviors may be associated and stored, and used to update the corresponding historical parking data. In some embodiments, sensing data detected by a sensor of the vehicle in the process of controlling the vehicle to park may further be acquired, and the parking environment data is updated according to the sensing data. The takeover behavior, the braking behavior and the sensing data detected by the sensor of the vehicle may be stored in the local parking data of the vehicle, and uploaded to the server at the appropriate time. Therefore, it is possible to iterate, according to the risk of multiple use by users, feed back and road repair, an algorithm model through scenario data accumulated many times to improve the scenario adaptability, thereby dynamically adjusting usage permissions of different parking environments. Accordingly, more and more roads can be used outside the vehicle, thereby improving the stability and adaptability of the system.

It should be appreciated that, in addition to being performed at the vehicle, the method 300 may be performed at the server 230. In this situation, the server 230 determines and selects a risk level and a corresponding constraint set of the parking environment, and may transmit the selected constraint set to the vehicle, for controlling the vehicle to park.

The above describes an adaptive parking solution according to the embodiment of the present disclosure. According to this solution, if it is determined that the risk of the current parking environment is high, a more secure constraint set may be selected, and if it is determined that the risk is low, a more convenient constraint set may be selected. Accordingly, the usage mode of the parking technology can be flexibly adjusted, and the application range of the parking technology can be widened, which brings convenience to the user while the safety is guaranteed.

Figure 4:
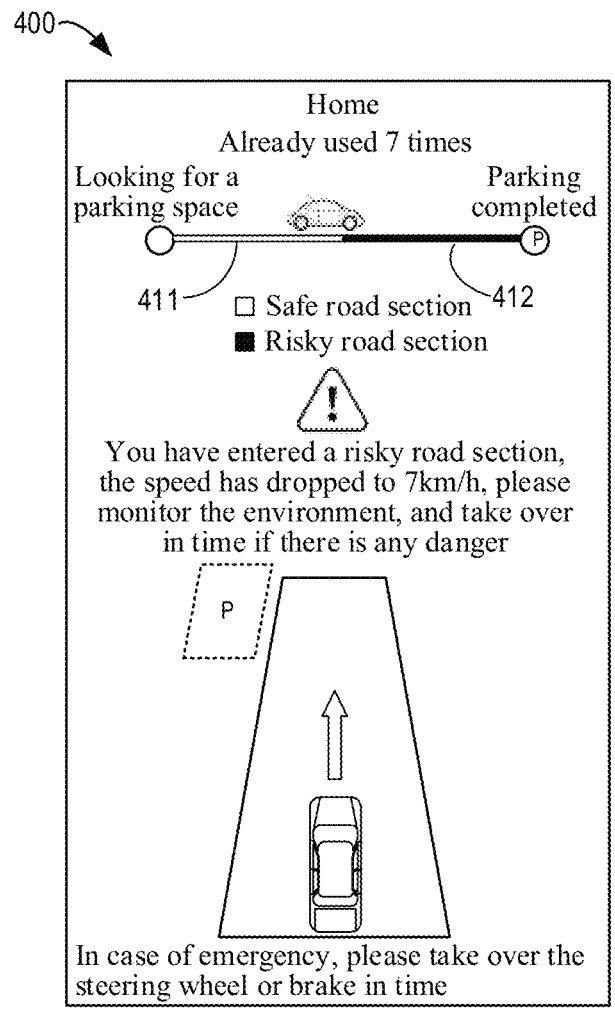
FIG. 4 is a schematic diagram of an exemplary user interface for parking a vehicle according to an embodiment of the present disclosure.

FIG. 4 is a schematic diagram of a user interface 400 for parking a vehicle according to an embodiment of the present disclosure. The user interface 400 may be presented on a user interaction interface in a vehicle or on a mobile device of a user.

As shown in the drawing, the route starting from the time of looking for a parking space to the time of the completion of parking is divided into a safe road section 411 and a risky road section 412. According to an embodiment of the present disclosure, in the safe road section 411, the vehicle may use an easy constraint set to liberate the user from a driving task. However, once it is detected that the vehicle enters the risky road section 412, a prompt message (e.g., "you have entered a risky road section, the speed has dropped to 7 km/h, please monitor the environment, and take over in time if there is any danger") may be displayed on the interface 400. In some embodiments, the user may further be prompted by voice or an alarm tone that the user has entered the parking environment having a high risk.

As shown in the drawing, when the vehicle enters a parking environment having a higher risk, the constraint of the parking varies. For example, the travel speed of the vehicle is automatically reduced to 7 km/hour. In other scenarios, the vehicle may further prompt the user to hold the steering wheel (when the user is in the vehicle), or to turn on the mobile device to supervise the vehicle (e.g., watch a video) on the mobile device. That is, the requirement for the user to supervise the vehicle is increased.

It can be seen that the adaptive parking solution according to the present disclosure is capable of dynamically determining the risk level and constraint of the parking environment, thereby increasing the adaptability of the parking technology and ensuring the driving safety.

Figure 5:
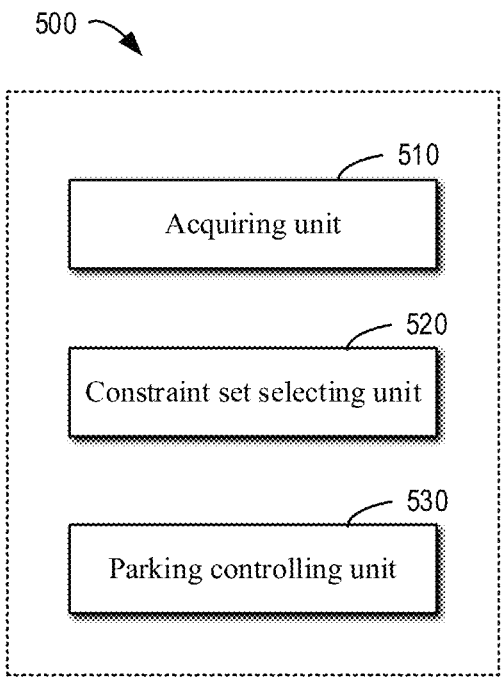
FIG. 5 is a schematic block diagram of an apparatus for parking a vehicle according to an embodiment of the present disclosure.

The embodiments of the present disclosure further provide a corresponding apparatus for implementing the above method or process. FIG. 5 is a schematic block diagram of an apparatus 500 for parking a vehicle according to an embodiment of the present disclosure. The apparatus 500 is disposed in the parking management engine 205 of the vehicle 210 as shown in FIG. 2. Alternatively, the apparatus 500 may also be disposed in the server 230.

The apparatus 500 includes an acquiring unit 510, a constraint set selecting unit 520 and a parking controlling unit 530. The acquiring unit 510 is configured to acquire parking environment data of a parking environment related to a vehicle and historical parking data in the parking environment. The constraint set selecting unit 520 is configured to select, according to the parking environment data and the historical parking data, a constraint set for parking the vehicle from a plurality of constraint sets, the plurality of constraint sets corresponding to a corresponding parking risk level. The parking controlling unit 530 is configured to control the vehicle to park according to the selected constraint set.

In some embodiments, the acquiring unit 510 may be further configured to acquire static environment information of the parking environment. The acquiring unit 510 may be further configured to acquire dynamic environment information of the parking environment. The acquiring unit 510 may be further configured to acquire communication condition information of the parking environment.

In some embodiments, the static environment information may include a road condition and/or parking space condition on a parking route. The dynamic environment information may include traffic information, weather information and/or positioning reference information on the parking route. The communication condition information may include a network condition of a cellular communication and/or a network condition of a Bluetooth communication. The network condition may include the stability and speed of a network.

In some embodiments, the historical parking data may include statistical data of a historical behavior of a user of the vehicle or an other user of the vehicle in the parking environment. The historical behavior may include a user takeover behavior and a braking behavior.

In some embodiments, a constraint set in the plurality of constraint sets may include a constraint for a position of the user relative to the vehicle, a constraint for a type of an interaction between the user and the vehicle, a constraint for a distance between the user and the vehicle; a constraint for a speed at which the vehicle is parked; and a constraint for a requirement for the user to supervise the vehicle.

In some embodiments, the apparatus 500 may further include an updating unit. The updating unit may be configured to: record a takeover behavior and braking behavior of the user of the vehicle in a process of controlling the vehicle to park; and update the historical parking data according to the takeover behavior and the braking behavior.

In some embodiments, the updating unit may be further configured to: acquire sensing data detected by a sensor of the vehicle in the process of controlling the vehicle to park; and update the parking environment data according to the sensing data.

In the technical solution of the present disclosure, the acquisition, storage, application, etc. of the personal information of a user all comply with the provisions of the relevant laws and regulations, and do not violate public order and good customs.

It should be understood that the each described unit in the apparatus 500 corresponds to each step in the method 300 described with reference to FIG. 3. Moreover, the operations and features of the apparatus 500 and the units included therein all correspond to the above operations and features described in combination with FIG. 3 and have the same effects, and thus, the specific details will not be repeated.

The units included in the apparatus 500 may be implemented by various means, including software, hardware, firmware, or any combination thereof. In some embodiments, one or more units may be implemented by means of software and/or firmware, for example, a machine-executable instruction stored on a storage medium. In addition to or as an alternative to the machine-executable instruction, some or all of the units in the apparatus 500 may be implemented, at least in part, by one or more hardware logic components. As an example rather than a limitation, exemplary types of hardware logic components that may be used include a field programmable gate array (FPGA), an application specific integrated circuit (ASIC), an application specific standard product (ASSP), a system on chip (SOC), a complex programmable logic device (CPLD), etc.

Some or all of the units shown in FIG. 5 may be implemented as hardware modules, software modules, firmware modules, or any combination thereof. In particular, in some embodiments, the procedures, methods or processes described above may be implemented by means of hardware in a storage system or a host corresponding to the storage system or an other computing device independent of the storage system.

Figure 6:
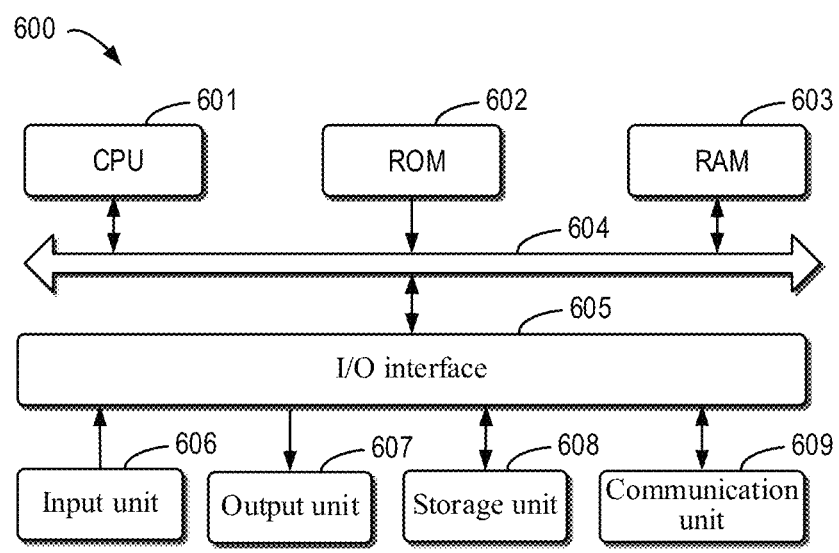
FIG. 6 is a block diagram of a computing device that can implement a plurality of embodiments of the present disclosure.

FIG. 6 is a schematic block diagram of an exemplary computing device 600 that may be used to implement the embodiments of the present disclosure. The device 600 may be implemented in the vehicle 210 and server 230 shown in FIG. 2. As shown in the drawing, the device 600 includes a central processing unit (CPU) 601, which may execute various appropriate actions and processes in accordance with a computer program instruction stored in a read-only memory (ROM) 602 or a computer program instruction loaded into a random access memory (RAM) 603 from a storage unit 608. The RAM 603 further stores various programs and data required by operations of the device 600. The CPU 601, the ROM 602 and the RAM 603 are connected to each other through a bus 604. An input/output (I/O) interface 605 is also connected to the bus 604.

A plurality of components in the device 600 are coupled to the I/O interface 605, including: an input unit 606, such as a keyboard or a mouse; an output unit 607, such as various types of displays, or speakers; the storage unit 608, such as a disk or an optical disk; and a communication unit 609 such as a network card, a modem, or a wireless communication transceiver. The communication unit 609 allows the device 600 to exchange information/data with other devices over a computer network such as the Internet and/or various telecommunication networks.

The CPU 601 performs the various methods and processes described above, such as the method 300. For example, in some embodiments, the method described above may be implemented as a computer software program, which is tangibly included in a machine readable medium, such as the storage unit 608. In some embodiments, part or all of the computer program may be loaded and/or installed on the device 600 via the ROM 602 and/or the communication unit 609. When the computer program is loaded into the RAM 603 and executed by the CPU 601, one or more steps of any of the methods described above may be performed. Alternatively, in other embodiments, the CPU 601 may be configured to perform any of the methods described above by any other appropriate means (for example, by means of firmware).

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

Furthermore, although operations are depicted in a particular order, this should be understood to require that such operations be performed in the particular order shown or in a sequential order, or that all illustrated operations should be performed to achieve desired results. Under certain circumstances, multitasking and parallel processing may be advantageous. Likewise, although the above discussion contains several implementation-specific details, these should not be construed as limitations on the scope of the present disclosure. Certain features that are described in the context of separate embodiments can also be implemented in combination in a single implementation. Conversely, various features that are described in the context of a single implementation can also be implemented in multiple implementations separately or in any suitable subcombination.

Although the subject matter has been described in language specific to structural features and/or logical acts of method, it is to be understood that the subject matter defined in the appended claims is not necessarily limited to the specific features or acts described above. Rather, the specific features and acts described above are merely example forms of implementing the claims.

What is claimed is:

1. A method for parking a vehicle, comprising:
acquiring parking environment data of a parking environment related to a vehicle and historical parking data in the parking environment;
selecting, according to the parking environment data and the historical parking data, a constraint set for parking the vehicle from a plurality of constraint sets, the plurality of constraint sets corresponding to a corresponding parking risk level; and
controlling the vehicle to park according to the selected constraint set, wherein each constraint set of the plurality of constraint sets comprises one or more constraints, each constraint in each constraint set refers to a permission or restriction condition related to the parking of the vehicle, and each constraint set comprising at least one of the following constraints:
a position of a user relative to the vehicle;
a type of an interaction between the user and the vehicle;
a distance between the user and the vehicle;
a speed at which the vehicle is parked; and
a requirement for the user to supervise the vehicle.

2. The method according to claim 1, wherein the acquiring parking environment data of a parking environment related to a vehicle comprises acquiring at least one of:
static environment information of the parking environment;
dynamic environment information of the parking environment; and
communication condition information of the parking environment.

3. The method according to claim 2, wherein,
the static environment information comprises at least one of a road condition and a parking space condition on a parking route,
the dynamic environment information comprises at least one of traffic information, weather information and positioning reference information on the parking route, and
the communication condition information comprises at least one of a network condition of a cellular communication and a network condition of a Bluetooth communication.

4. The method according to claim 1, wherein the historical parking data comprises statistical data of a historical behavior of a user of the vehicle or an other user of the vehicle in the parking environment, and the historical behavior comprises a user takeover behavior and a braking behavior.

5. The method according to claim 1, further comprising:
recording a takeover behavior and a braking behavior of a user of the vehicle in a process of controlling the vehicle to park; and
updating the historical parking data according to the takeover behavior and the braking behavior.

6. The method according to claim 1, further comprising:
acquiring sensing data detected by a sensor of the vehicle in a process of controlling the vehicle to park; and
updating the parking environment data according to the sensing data.

7. An electronic device, comprising:
at least one processor; and
a storage device, communicated with the at least one processor,
wherein the storage device stores an instruction executable by the at least one processor, and the instruction is executed by the at least one processor to enable the at least one processor to perform operations comprising:
acquiring parking environment data of a parking environment related to a vehicle and historical parking data in the parking environment;
selecting, according to the parking environment data and the historical parking data, a constraint set for parking the vehicle from a plurality of constraint sets, the plurality of constraint sets corresponding to a corresponding parking risk level; and
controlling the vehicle to park according to the selected constraint set, wherein each constraint set of the plurality of constraint sets comprises one or more constraints, each constraint in each constraint set refers to a permission or restriction condition related to the parking of the vehicle, and each constraint set comprising at least one of the following constraints:
a position of a user relative to the vehicle;
a type of an interaction between the user and the vehicle;
a distance between the user and the vehicle;
a speed at which the vehicle is parked; and
a requirement for the user to supervise the vehicle.

8. The electronic device according to claim 7, wherein the acquiring parking environment data of a parking environment related to a vehicle comprises acquiring at least one of:
static environment information of the parking environment;
dynamic environment information of the parking environment; and
communication condition information of the parking environment.

9. The electronic device according to claim 8, wherein, the static environment information comprises at least one of a road condition and a parking space condition on a parking route, the dynamic environment information comprises at least one of traffic information, weather information and positioning reference information on the parking route, and the communication condition information comprises at least one of a network condition of a cellular communication and a network condition of a Bluetooth communication.

10. The electronic device according to claim 7, wherein the historical parking data comprises statistical data of a historical behavior of a user of the vehicle or an other user of the vehicle in the parking environment, and the historical behavior comprises a user takeover behavior and a braking behavior.

11. The electronic device according to claim 7, the operations further comprising:
recording a takeover behavior and a braking behavior of a user of the vehicle in a process of controlling the vehicle to park; and
updating the historical parking data according to the takeover behavior and the braking behavior.

12. The electronic device according to claim 7, the operations further comprising:
acquiring sensing data detected by a sensor of the vehicle in a process of controlling the vehicle to park; and
updating the parking environment data according to the sensing data.

13. A non-transitory computer readable storage medium, storing a computer instruction, wherein the computer instruction when executed by a computer causes the computer to perform operations comprising:
acquiring parking environment data of a parking environment related to a vehicle and historical parking data in the parking environment;
selecting, according to the parking environment data and the historical parking data, a constraint set for parking the vehicle from a plurality of constraint sets, the plurality of constraint sets corresponding to a corresponding parking risk level; and
controlling the vehicle to park according to the selected constraint set, wherein each constraint set of the plurality of constraint sets comprises one or more constraints, each constraint in each constraint set refers to a permission or restriction condition related to the parking of the vehicle, and each constraint set comprising at least one of the following constraints:
a position of a user relative to the vehicle;
a type of an interaction between the user and the vehicle;
a distance between the user and the vehicle;
a speed at which the vehicle is parked; and
a requirement for the user to supervise the vehicle.

14. The storage medium according to claim 13, wherein acquiring parking environment data of a parking environment related to a vehicle comprises acquiring at least one of:
   static environment information of the parking environment;
   dynamic environment information of the parking environment; and
   communication condition information of the parking environment.

15. The storage medium according to claim 14, wherein,
   the static environment information comprises at least one of a road condition and a parking space condition on a parking route,
   the dynamic environment information comprises at least one of traffic information, weather information and positioning reference information on the parking route, and
   the communication condition information comprises at least one of a network condition of a cellular communication and a network condition of a Bluetooth communication.

16. The storage medium according to claim 13, wherein the historical parking data comprises statistical data of a historical behavior of a user of the vehicle or an other user of the vehicle in the parking environment, and the historical behavior comprises a user takeover behavior and a braking behavior.

17. The storage medium according to claim 13, the operations further comprising:
   recording a takeover behavior and a braking behavior of a user of the vehicle in a process of controlling the vehicle to park; and
   updating the historical parking data according to the takeover behavior and the braking behavior.

18. The storage medium according to claim 13, the operations further comprising:
   acquiring sensing data detected by a sensor of the vehicle in a process of controlling the vehicle to park; and
   updating the parking environment data according to the sensing data.

* * * * *